US010387996B2

(12) United States Patent
Cohen et al.

(10) Patent No.: US 10,387,996 B2
(45) Date of Patent: Aug. 20, 2019

(54) SYSTEM AND METHOD FOR PANORAMIC IMAGE PROCESSING

(71) Applicant: TRAX TECHNOLOGY SOLUTIONS PTE. LTD., Singapore (SG)

(72) Inventors: Shimon Daniel Cohen, Ra'anana (IL); Noga Zieber, Tel Aviv (IL); Rotem Littman, Hod Hasharon (IL); Udy Danino, Bnei-Brak (IL)

(73) Assignee: TRAX TECHNOLOGY SOLUTIONS PTE LTD., Singapore (SG)

( * ) Notice: Subject to any disclaimer, the term of this patent is extended or adjusted under 35 U.S.C. 154(b) by 347 days.

(21) Appl. No.: 15/115,381

(22) PCT Filed: Jan. 21, 2015

(86) PCT No.: PCT/IL2015/050070

§ 371 (c)(1),
(2) Date: Jul. 29, 2016

(87) PCT Pub. No.: WO2015/114621

PCT Pub. Date: Aug. 6, 2015

(65) Prior Publication Data

US 2017/0011488 A1 Jan. 12, 2017

(30) Foreign Application Priority Data

Feb. 2, 2014 (IL) .......................................... 230773

(51) Int. Cl.
*G06K 9/20* (2006.01)
*G06T 3/00* (2006.01)
(Continued)

(52) U.S. Cl.
CPC .......... *G06T 3/0075* (2013.01); *G06T 3/0006* (2013.01); *G06T 3/4038* (2013.01);
(Continued)

(58) Field of Classification Search
CPC ..... G06T 3/0075; G06T 7/003; G06T 7/0038; G06T 3/4037; G06T 3/60; H04N 5/2257
(Continued)

(56) References Cited

U.S. PATENT DOCUMENTS

| | | | |
|---|---|---|---|
| 6,195,122 | B1 | 2/2001 | Vincent |
| 6,618,511 | B1 | 9/2003 | Mancuso et al. |

(Continued)

FOREIGN PATENT DOCUMENTS

| | | |
|---|---|---|
| JP | 2002/295959 | 10/2002 |
| JP | 2003/004366 | 1/2003 |

(Continued)

OTHER PUBLICATIONS

International Search Report from the Israel Patent Office for International Application No. PCT/IL2015/050070, dated Apr. 28, 2015.

(Continued)

*Primary Examiner* — On S Mung
(74) *Attorney, Agent, or Firm* — Finnegan, Henderson, Farabow, Garrett & Dunner LLP

(57) ABSTRACT

The present disclosure provides a computer implemented method of image processing comprising, upon receiving of first and second images from an imaging unit, the first and second images being respectively associated with first and second rotational changes between a reference orientation and the orientations of the first and second images: processing data representative of the first image and of the second image to compensate the first and second rotational changes between the reference orientation and the respective orientations of the first and second images, thereby obtaining first and second corrected images; processing the first corrected image to detect distinctive keypoints within a fronto-parallel strip of the first corrected image; searching keypoints in the second corrected image corresponding to the detected key-
(Continued)

points, and estimating a geometric transformation between the first and second images based on matching the keypoints in the first and the second corrected images.

19 Claims, 8 Drawing Sheets

(51) Int. Cl.

| | |
|---|---|
| ***G06T 3/40*** | (2006.01) |
| ***G06T 3/60*** | (2006.01) |
| ***G06T 7/33*** | (2017.01) |
| ***G06T 7/38*** | (2017.01) |
| ***H04N 5/225*** | (2006.01) |
| ***H04N 5/232*** | (2006.01) |

(52) U.S. Cl.
CPC .................. *G06T 3/60* (2013.01); *G06T 7/33* (2017.01); *G06T 7/337* (2017.01); *G06T 7/38* (2017.01); *H04N 5/2257* (2013.01); *G06K 2009/2045* (2013.01); *G06T 2207/10016* (2013.01); *H04N 5/23293* (2013.01)

(58) Field of Classification Search
USPC ............................................................ 348/36
See application file for complete search history.

(56) References Cited

U.S. PATENT DOCUMENTS

| | | | |
|---|---|---|---|
| 7,031,948 | B2 | 4/2006 | Lee |
| 7,103,236 | B2 | 9/2006 | Peterson |
| 7,210,136 | B2 | 4/2007 | Swett |
| 7,287,731 | B2 | 10/2007 | Johnson |
| 7,620,909 | B2 | 11/2009 | Park et al. |
| 7,903,883 | B2 | 3/2011 | Zitnick et al. |
| 8,131,086 | B2 | 3/2012 | Hua et al. |
| 8,515,207 | B2 | 8/2013 | Chau |
| 8,559,766 | B2 | 10/2013 | Tilt et al. |
| 9,160,899 | B1 | 10/2015 | Boyle et al. |
| 2005/0256391 | A1 | 11/2005 | Satoh et al. |
| 2007/0025723 | A1 | 2/2007 | Baudisch et al. |
| 2007/0031062 | A1 | 2/2007 | Pal et al. |
| 2007/0070233 | A1 | 3/2007 | Patterson |
| 2007/0081081 | A1 | 4/2007 | Cheng |
| 2008/0074489 | A1 | 3/2008 | Zhang et al. |
| 2008/0247667 | A1 | 10/2008 | Jin et al. |
| 2009/0003708 | A1 | 1/2009 | Steinberg et al. |
| 2009/0192921 | A1 | 7/2009 | Hicks |
| 2010/0035637 | A1 | 2/2010 | Varanasi et al. |
| 2010/0097443 | A1 | 4/2010 | Lablans |
| 2010/0171826 | A1 | 7/2010 | Hamilton et al. |
| 2010/0222099 | A1 | 9/2010 | Fields |
| 2010/0321470 | A1 | 12/2010 | Oshima |
| 2011/0007154 | A1 | 1/2011 | Vogel et al. |
| 2011/0058715 | A1 | 3/2011 | Doering et al. |
| 2011/0079083 | A1 | 4/2011 | Yoo et al. |
| 2011/0173082 | A1 | 7/2011 | Breitenbach et al. |
| 2011/0173100 | A1 | 7/2011 | Boncyk et al. |
| 2012/0027390 | A1 | 2/2012 | Ueyama |
| 2012/0051652 | A1 | 3/2012 | Lee et al. |
| 2012/0075411 | A1 | 3/2012 | Matsumoto et al. |
| 2012/0243739 | A1 | 9/2012 | Fukuchi et al. |
| 2012/0293607 | A1 | 11/2012 | Bhogal et al. |
| 2012/0300019 | A1 | 11/2012 | Yang et al. |
| 2014/0009382 | A1 | 1/2014 | Chou et al. |
| 2014/0052555 | A1 | 2/2014 | MacIntosh |
| 2015/0139535 | A1 | 5/2015 | Siddiqui |
| 2015/0141759 | A1 | 5/2015 | Charles et al. |
| 2015/0187101 | A1 | 7/2015 | Maayan et al. |
| 2015/0193909 | A1 | 7/2015 | Maayan et al. |
| 2016/0143459 | A1 | 5/2016 | Clein |

FOREIGN PATENT DOCUMENTS

| | | |
|---|---|---|
| JP | 2007/046833 | 2/2007 |
| WO | WO-2012/155121 | 9/2004 |
| WO | WO-2008/107150 | 9/2008 |
| WO | WO-2009/027835 | 3/2009 |
| WO | WO-2014/181323 | 11/2012 |
| WO | WO-2015/083170 | 6/2015 |
| WO | WO-2015/114621 | 8/2015 |
| WO | 2015/193877 | 12/2015 |

OTHER PUBLICATIONS

Written Opinion of the International Searching Authority from the Israel Patent Office for International Application No. PCT/IL2015/050070, dated Apr. 28, 2015.
Changchang Wu et al.; "3D Model Matching With Viewpoint—Invariant Patches (VIP)", Computer Vision and Pattern Recognition, CVPR 2008, IEEE Conference, pp. 1-8, (2008).
International Search Report and Written Opinion from the Israel Patent Office for International Application No. PCT/IL2014/050378, dated Aug. 7, 2014.
International Search Report and Written Opinion from the Israel Patent Office for International Application No. PCT/IL2014/051061, dated Mar. 26, 2015.
International Search Report and Written Opinion from the Israel Patent Office for International Application No. PCT/IL2014/051127, dated May 15, 2015.
International Search Report and Written Opinion from the Israel Patent Office for International Application No. PCT/IL2015/050070, dated Apr. 28, 2015.
International Search Report from the Israel Patent Office for International Application No. PCT/IL2015/050576, dated Oct. 14, 2015.
International Search Report from the Israel Patent Office for International Application No. PCT/IL2014/050377, dated Jul. 25, 2014.

SYSTEM AND METHOD FOR PANORAMIC IMAGE PROCESSING

CROSS REFERENCE TO RELATED APPLICATIONS

This application is a national phase application based on PCT/IL2015/050070, filed Jan. 21, 2015, which claims the priority of Israeli Patent Application No. 230773, filed Feb. 2, 2014; the content of both applications being incorporated herein by reference.

TECHNOLOGICAL FIELD

The present disclosure relates generally to the field of image processing. More particularly, the present disclosure relates to methods and systems useful in the domain of panoramic image processing of images acquired from multiple viewpoints located along a linear path.

BACKGROUND

Panoramic photography may be defined generally as a photographic technique for capturing images with elongated fields of view. In recent years, static viewpoint panoramic photography, obtained by pivoting a camera around a single viewpoint, has become increasingly popular due to the development of accessible electronic handheld device applications. Unlike a local panorama at a static viewpoint, a multiple viewpoint panorama is constructed from partial views at consecutive viewpoints along a path. There are many challenges associated with taking high quality multiple viewpoint panoramic images. Particularly, these challenges include parallax problems i.e. problems caused by apparent displacement or difference in the apparent position of an object in the panoramic scene in consecutive captured images. Also, these challenges include post processing problems because assembling the images may result in computationally intensive activity. Furthermore, these problems are heightened in a retail store environment, at least because the depth of field is short in the aisle of a store, and because of the high resolution required for further exploitation of the panoramic image through object recognition techniques.

GENERAL DESCRIPTION

In the present application, the following terms and their derivatives may be understood in light of the below explanations:

Imaging Unit

An imaging unit may be an apparatus capable of acquiring pictures of a scene. In the following it is also generally referred to as a camera and it should be understood that the term camera encompasses different types of imaging units such as standard digital cameras, electronic handheld devices including imaging sensors, etc. Advantageously, a camera may be provided with means configured to estimate a rotational change of the camera. Said means may include a gyroscope, an accelerometer and/or an image processing module capable of determining a rotational change (an orientation variation) from image to image and/or with respect to a reference orientation. In the description, the camera pinhole model may be used as a support for illustration. The intrinsic parameters of the camera may be predetermined and the camera may be calibrated.

Furthermore, in the following, it is understood that the images processed may preferably be overlapping images (at least a part of one of the images is found in the other image) and acquired from multiple viewpoints located along a linear path.

Orientation

The term orientation may herein refer to a positional attitude of a camera acquiring an image with respect to a referential frame. With reference to FIG. 1, the orientation of a camera 1 may be expressed using Euler angles (ω, θ, φ) with respect to a referential frame (X, Y, Z) of the camera 1. It is noted that the term rotational change used in the following may refer to data indicative of Euler angles (ω, θ, φ). The referential frame (X, Y, Z) may be centered on the optical center of the camera 1. In some embodiments, the referential frame (X, Y, Z) may be defined while acquiring an image 100— for example a first image of a stream of images—by a roll axis Z supporting an optical axis of the camera 1. A pan axis Y and a tilt axis X of the referential frame (X, Y, Z) may further be perpendicular to the roll axis Z and respectively oriented collinear to the horizontal axis x and vertical axis y of an image plane referential (x,y). As explained hereinafter, in some embodiments of the present disclosure, the camera 1 may be swept to provide a stream of overlapping images. The scanning direction may be supported by the tilt axis X (horizontal scanning) or the pan axis Y (vertical scanning). In some embodiments, the scanning may be performed to image an extended object supported on a flat surface (ground), the referential frame may be defined so that the tilt axis X is horizontal with respect to the flat surface and the pan axis Y is oriented vertically with respect to the flat surface along a gravity vector g i.e. the camera may be oriented perpendicular to an object plane, such that a vertical object appears vertical in the image when the image is held on one of its edges. It is noted that, in the following, the term "orientation of an image" may be used instead of the term "orientation of an imaging unit (sensor) acquiring said image" for the sake of conciseness.

Scanning

In some embodiments of the present disclosure, panoramic image processing may be used for building a multiple viewpoint panorama. For example, a set of images may be acquired by displacing the camera along an axis (scanning direction) in front of a scene. Further, the scene imaged may advantageously be such that the scene geometry lies along a dominant plane (for example an aisle of a grocery store). The terms "scanning" or "sweeping" may refer to translating an imaging unit along a scanning direction while acquiring images with the imaging unit. It is noted that advanced scanning may comprise several stages with different scanning directions. For example, a scanning may contain one or more horizontal and/or vertical stages so as to capture a whole shelving unit.

Fronto-parallel Strip

As already mentioned in the present disclosure, a set (stream) of images processed may result from a scanning of the camera along an axis i.e. a translation of the camera while theoretically maintaining the orientation of the camera in a reference orientation. A first image of the stream of images may define the reference orientation of the camera i.e. a rotational change (Euler angle) of the following images of the stream may refer to orientation of the first image. However, practically, during scanning, orientation of the camera may be unwittingly modified by a user performing such scanning. The present disclosure proposes to recognize a fronto-parallel strip of a corrected image, based on the rotational change of said image with respect to the reference orientation, and to perform registration and/or stitching based on the recognized fronto-parallel strip. In the present disclosure, the term perpendicular strip (or band) may be understood as a slice of an image in a vertical direction (along the y axis) or in a horizontal direction (along the x axis). FIG. 2A illustrates an image 11, a corrected image 12 and a fronto-parallel strip 13 in the case of horizontal scanning. The corrected image 12 may be obtained using the rotational change by projective homography and the fronto-parallel strip 13 is the central perpendicular (vertical) strip in the corrected image 12.

The fronto-parallel strip selection may include the following steps: extracting the rotational change based on positional sensor measurements, calculating a fronto-parallel warped image by applying the correction transform on the input image, marking, in the warped image a region of the input image (marked with broken lines on FIG. 2A) and calculating its center coordinate, by selecting a narrow strip around the center coordinate.

The fronto-parallel strip 13 may generally reflect the portion of an image which would have appeared in the central perpendicular strip of the image if the camera was held according to the reference orientation i.e. with a rotational change equal to zero. More particularly, the perpendicular strip is a vertical strip when the image results from a horizontal scanning along the X axis or a horizontal strip when the image results from a vertical scanning along the Y axis. A width of the fronto-parallel strip may be defined by a width parameter which may be in the range of 1-5% or 5-10% of the field of view (FOV) along the scanning direction of the FOV, preferably 3%, 5% or 7%. In other words, the fronto-parallel strip may be understood as a portion of an image, imaging objects which are positioned in a region of the scene which can be defined from the frame referential (X, Y, Z) centered at the position of the camera acquiring the image by:

$$\omega=[-\alpha*\omega_{max}/2;\alpha*\omega_{max}/2], \text{ and}$$

$$\theta=[\theta_{max}/2;\theta_{max}/2],$$

wherein $\alpha$ is the width parameter, $\omega_{max}$ is the width of the field of view and $\theta_{max}$ is the height of the field of view.

As explained, the fronto-parallel strip may be determined by correcting an acquired image based on the rotational change of said image with respect to the reference orientation and by selecting a central strip of the resulting corrected image.

As illustrated on FIG. 2B, when the rotational change between the first image and the reference orientation is higher than a threshold rotational change, the fronto-parallel strip is defined as the strip in closest proximity to the theoretical central strip, and which contains information. The rotational threshold may be derived from the camera parameters (FOV, focal length, etc.).

The Applicant has found that, particularly in configurations of short depth of field such as in panoramic imaging of an aisle of a grocery store, performing image registration—and particularly transformation calculation/motion parameters for compensating translation and scale—between successive images based on fronto-parallel portions of the images, improves the quality of the panorama and lowers the computational requirements. Further, the Applicant has found that performing the stitching, by appending the fronto-parallel portions of successive corrected images one to another, further improves the quality of the panorama. Thus, the Applicant proposes a method of image processing for registering images which implements its finding and notably includes, in a first step the correction of a rotational change between two images and thereafter estimates the translation and scale deformation based on keypoints found in the fronto-parallel strip.

Therefore, the present disclosure provides, in a first aspect, a computer implemented method of image processing comprising, upon receiving of first and second images from an imaging unit, the first and second images being respectively associated with first and second rotational changes between a reference orientation and the orientations of the first and second images: processing (by the computer) data representative of the first image and of the second image to compensate the first and second rotational changes between the reference orientation and the respective orientations of the first and second images, thereby obtaining first and second corrected images; processing (by the computer) the first corrected image to detect distinctive keypoints within a fronto-parallel strip of the first corrected image; searching (by the computer) keypoints in the second corrected image corresponding to the detected keypoints, and estimating (by the computer) a geometric transformation between the first and second images based on matching the keypoints in the first and the second corrected images. For example, the imaging unit may be provided with a positional sensor which enables determining the first and second rotational changes.

In some embodiments, searching keypoints corresponding to the detected keypoints comprises, for each detected keypoint: defining a search area in the second corrected image based on a keypoint position in the first corrected image and on a rotational change between the first and second corrected images; and searching only in the defined search area.

In some embodiments, the rotational change between the first and second corrected images is derived from the rotational changes of the first and second images with respect to the reference orientation.

In some embodiments, defining the search area comprises estimating and correcting a translation of the imaging unit between a first acquisition position of the first image and a second acquisition position of the second image.

In some embodiments, detecting distinctive keypoints is performed using the Shi-Tomasi technique.

In some embodiments, keypoints located out of the fronto-parallel strip are discarded from further processing.

In some embodiments, a width of the fronto-parallel strip is variable and is set so as to include a sufficient amount of keypoints for enabling estimating the geometric transformation.

In some embodiments, estimating the geometric transformation is performed using a transformation model involving, exclusively, translation and scale. In fact, according to the proposed method, a rotational change is preliminarily corrected by the correction step, therefore, such a simple transformation model including translation and scale only is efficient to complete the calculation of the registration parameters.

In some embodiments, estimating a geometric transformation is performed using a random sample consensus (RANSAC) algorithm.

In some embodiments, the data representatives of the first image and of the second image are downsampled versions of the first and second images. This enables to perform the above described processing on lighter images, for example grey scale and medium resolution versions of the first and second images.

In a further aspect, the present disclosure relates to a method of panoramic image (also referred to as stitched image) creation comprising, upon receiving a sequence of images from an imaging unit, wherein each image of the sequence of images is associated with a rotational change between said image and the reference orientation: estimating geometric transformations between a sequence of successive pairs of (received) images according to the method of any of the preceding claims; computing a sequence of cumulative transformations, each cumulative transformation being associated with an (received) image of the sequence of successive pairs, by combining, for each (received) image of the sequence of successive pairs after the initial image, the geometric transformations estimated for the one or more (received) images preceding said (received) image; obtaining a sequence of corrected images corresponding to the (received) images of the successive pairs by processing data representative of at least part of said (received) images to compensate the rotational changes between the reference orientation and the respective orientations of said (received) images; obtaining a sequence of transformed images by applying each computed cumulative transformation to at least part of the corrected image corresponding to the (received) image associated with said cumulative transformation; and stitching the sequence of transformed images. The cumulative transformations may link a (received) image of the sequence of successive pairs to the initial image of the sequence of successive pairs.

In some embodiments, the data representative of at least part of said images comprise high resolution versions of at least a part of said images. This enables to obtain a high resolution stitched image allowing for further image recognition techniques.

In some embodiments, the at least part of the corrected image is the fronto-parallel strip of said corrected image. This notably enables to reduce computational requirements.

In some embodiments, the stitching includes using a seam algorithm.

In some embodiments, the (received) images result from scanning an aisle of a grocery store at multiple viewpoints located along a linear path.

In some embodiments, the reference orientation is an orientation of the initial image.

In some embodiments, the method further comprises monitoring an aperture level of a stitched image and modifying the reference orientation in order to maintain the aperture level in a predetermined range of apertures.

In some embodiments, stitching the sequence of transformed images is performed iteratively by computing, for each transformed image, an associated floating stitched image using said transformed image and a floating stitched image associated with a previous transformed image in the sequence of transformed images.

In some embodiments, the computing comprises appending an inner slice of the transformed image at an edge of a floating stitched image associated with the prior transformed image.

In some embodiments, the computing comprises superimposing an outer slice of the transformed image at an inner stitching portion of the floating stitched image associated with the prior transformed image.

In some embodiments, the data representative of at least part of said images comprise a low resolution version of at least a part of said images. This provides for a lower resolution stitched image which can further be displayed on a display window of a display screen of a system or handheld electronic device according to the present disclosure.

In a further aspect, the present disclosure provides a computer program product implemented on a non-transitory computer usable medium having computer readable program code embodied therein to cause the computer to perform the image processing method and/or a panoramic image creation method as previously described.

In a further aspect, the present disclosure provides for a system comprising: memory; an imaging unit; and a processing unit communicatively coupled to the memory and imaging unit, wherein the memory includes instructions for causing the processing unit to perform an image processing method and/or a panoramic image creation method as previously described.

In some embodiments, the memory, the imaging unit and the processing unit are part of a handheld electronic device.

In a further aspect, the present disclosure provides a method of panoramic imaging of a retail unit comprising: moving an imaging unit along a predetermined direction while acquiring a sequence of images of the retail unit; retrieving positional information of the imaging unit for each image and associating each image with a rotational change between said image and the first image of the sequence of images; creating a panoramic image according to the method previously described.

The Applicant has found that the above described technique of panoramic image creation which notably divides the tasks of apprehending an orientation variation and a translation and scale variation between successive images, enables to significantly improve post-processing computation and enhances the quality of the resulting panoramic image.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase “for example,” “such as”, “for instance” and variants thereof describe non-limiting examples of the subject matter.

Reference in the specification to “one example”, “some examples”, “another example”, “other examples, “one instance”, “some instances”, “another instance”, “other instances”, “one case”, “some cases”, “another case”, “other cases” or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as “generating”, “determining”, “providing”, “receiving”, “using”, “computing”, “transmitting”, “performing”, or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine’s registers and/or memories into other data similarly represented as physical quantities within the programmable machine’s memories, registers and/or other such information storage, transmission and/or display element(s).

The term “inner slice” may be used herein to refer to a slice of an image taken within (inside) the image i.e. an inner portion/cut of an image along a thickness of the image. The term “outer slice” (or “peripheral slice”) may be used, in contrast, to refer to a slice of an image along the thickness of the image which extends until an end of the image i.e. the outer slice reach three edges of the image.

Figure 1:
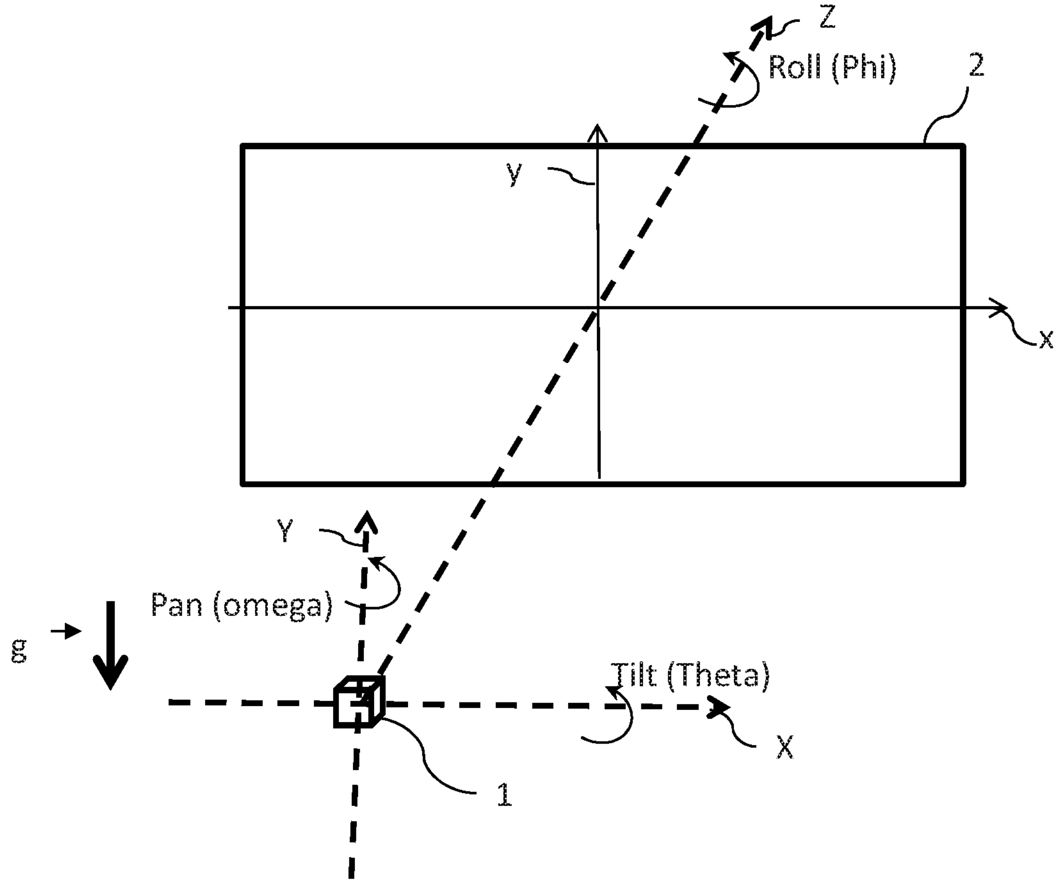
FIG. 1, already described, illustrates reference frames used for describing embodiments according to the present disclosure.
Figure 2A:
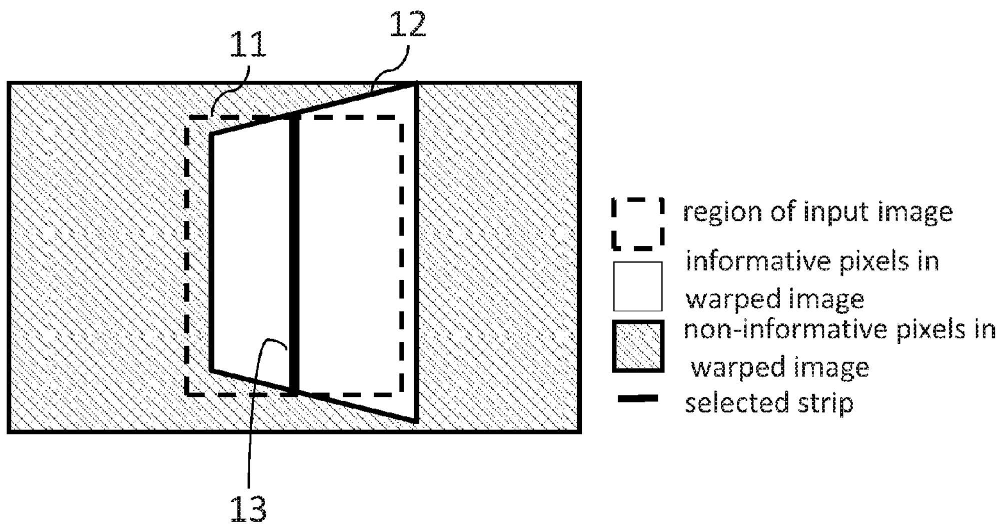
FIG. 2A-2B, already described, illustrate orientation correction of an image and fronto-parallel strip definition according to embodiments of the present disclosure.
Figure 2B:
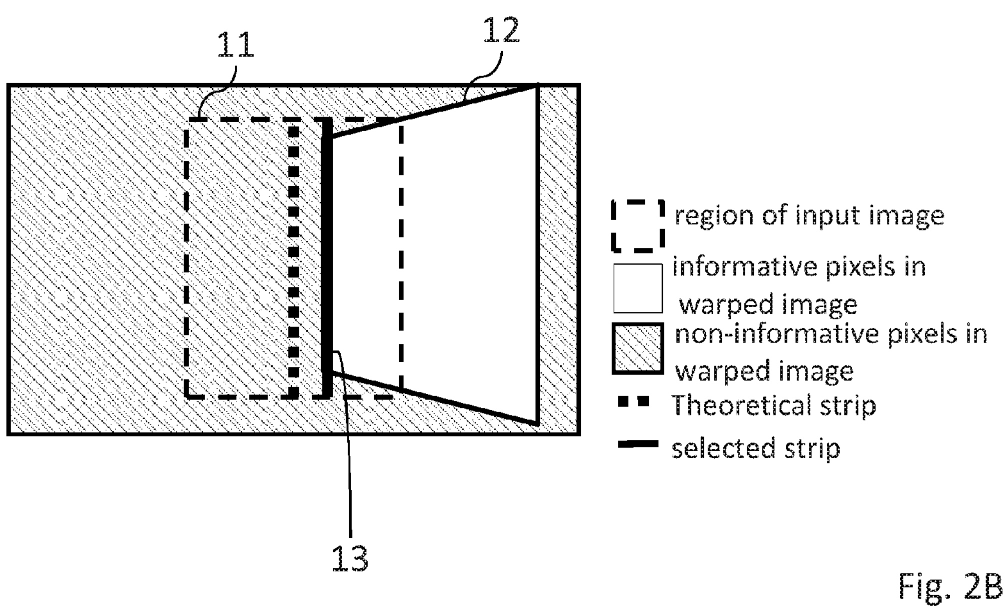
Figure 3:
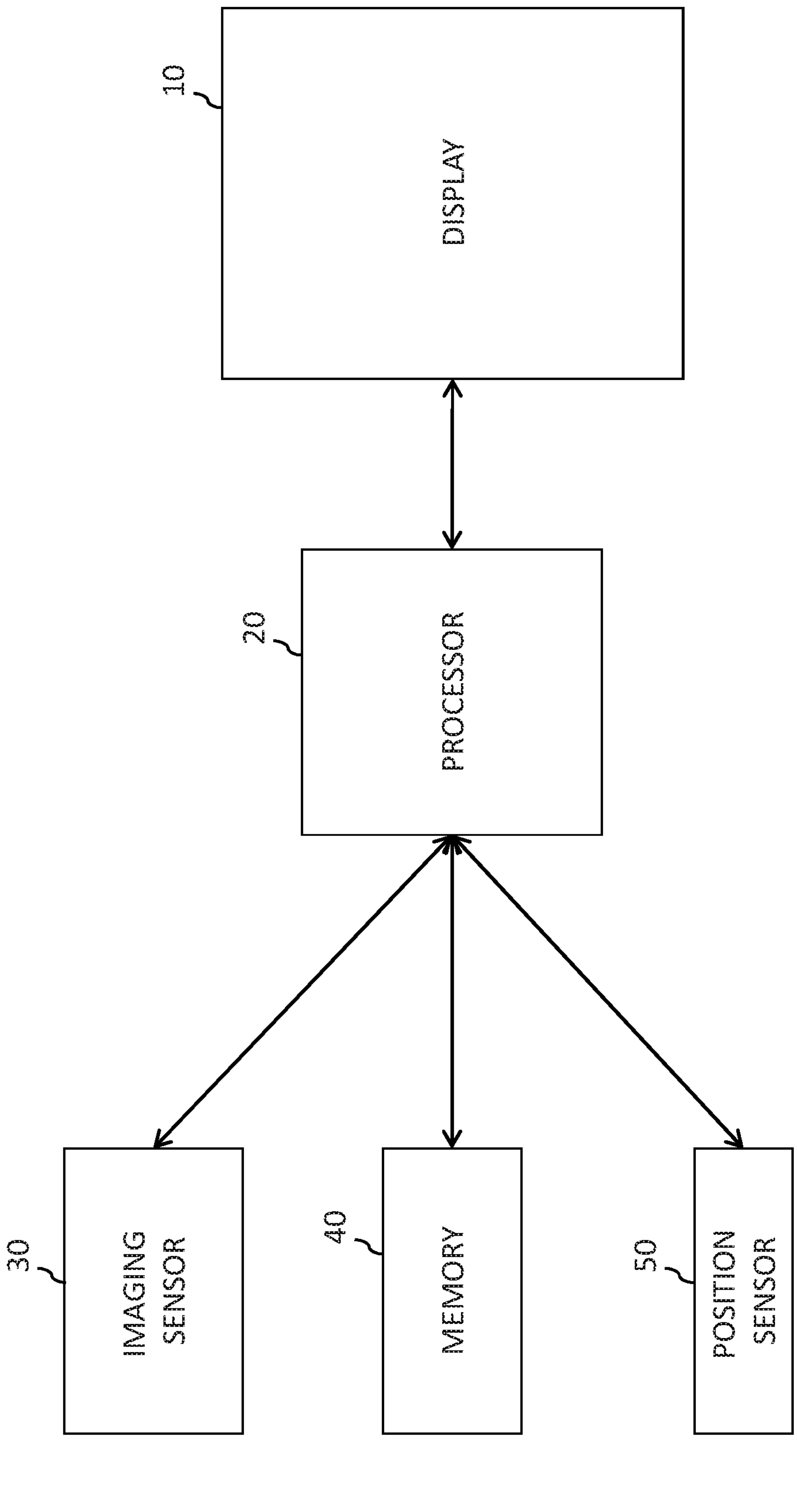
FIG. 3 is a block diagram illustrating schematically an electronic device according to embodiments of the present disclosure.

FIG. 3 illustrates a simplified functional block diagram of a system according to embodiments of the present disclosure. The system may be a handheld electronic device and may include a display 10, a processor 20, an imaging sensor 30, memory 40 and a position sensor 50. The processor 20 may be any suitable programmable control device and may control the operation of many functions, such as the generation and or processing of an image as well as other functions performed by the electronic device. The processor 20 may drive the display (display screen) 10 and may receive user inputs from a user interface. The display screen 10 may be a touch screen capable of receiving user inputs. The memory 40 may store software for implementing various functions of the electronic device including software for implementing the image processing method and the panoramic image creation method according to the present disclosure. The memory 40 may also store media such as images and video files. The memory 40 may include one or more storage mediums tangibly recording image data and program instructions, including for example a hard-drive, permanent memory and semi permanent memory or cache memory. Program instructions may comprise a software implementation encoded in any desired language. The imaging sensor 30 may be a camera with a predetermined field of view. The camera may either be used in a video mode in which a stream of images is acquired upon command of the user, or in a photographic mode in which a single image is acquired upon command of the user. The position sensor 50 may facilitate panorama processing. The position sensor 50 may include a gyroscope enabling calculation of a rotational change of the electronic device from image to image. The position sensor 50 may also be able to determine an acceleration and/or a speed of the electronic device according to three linear axes.

Figure 4:
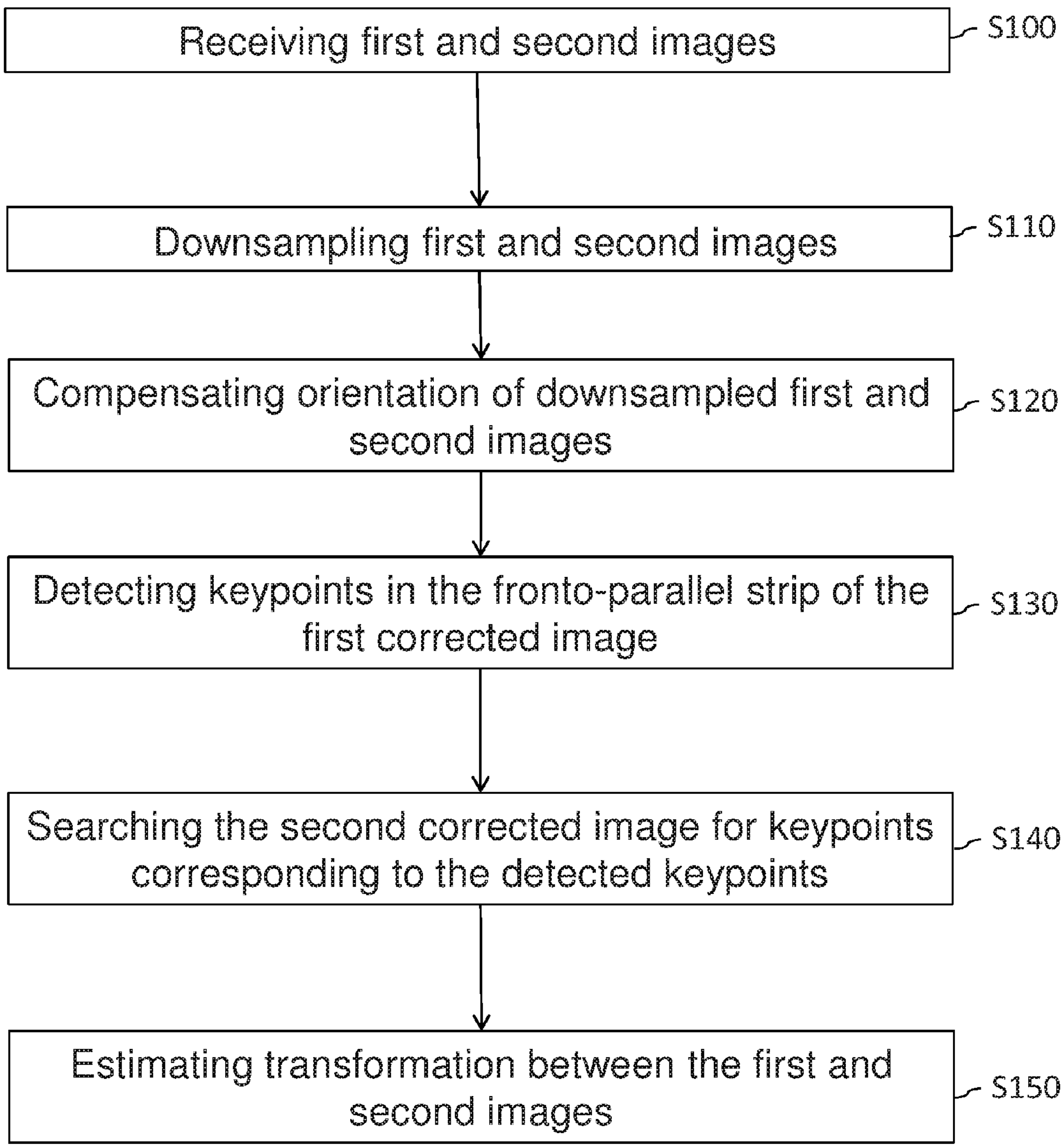
FIG. 4 is a block diagram illustrating steps of a method of image processing according to embodiments of the present disclosure.

FIG. 4 illustrates steps of a method of image processing according to embodiments of the present disclosure. The method may be implemented on the system previously disclosed. In a step S100, a first image and a second image may be received from the image sensor. The first and second images may be associated with a first and a second rotational change indicative respectively of a change of orientation between a reference orientation and the orientation of the first and second images. The reference orientation may be an orientation of a previously acquired image. The rotational changes may be retrieved from the positional sensor coupled to the system previously described. It is noted that the first image presently discussed in the image processing method is different from the initial image of the sequence of images discussed in the panoramic image creation method hereinafter. As explained above, the first and second images may be acquired while scanning a retail unit according to either a tilt (horizontal scanning) or pan axis (vertical scanning) of the imaging unit.

In a step S110, the first and second images may be downsampled to ease further processing. The downsampled versions may be of medium resolution (for example with a downsampling factor of 0.5) and/or grayscale versions. As explained below, this step may also be performed after step S120.

In a step S120, data representative of the first image and data representative of the second image (for example the downsampled versions of the first and second images) may be processed to obtain a first corrected image and a second corrected image. It is noted that in some embodiments, the orientation correction may be performed on the received images (or on high resolution images derived from the received images) and the downsampling step S110 may be performed subsequently to the orientation correction, thereby also leading to downsampled images with corrected orientation with respect to the reference orientation.

It is noted that a general camera matrix can be represented by:

$$P=K[R/T]$$

wherein P is the camera matrix, K is an intrinsic camera calibration matrix, R is a camera rotation matrix with respect to a world reference frame, and T is a camera translation vector with respect to the world reference frame.

Using these notations, when correcting pure rotation as assumed in step S120, there is projective homography (also referred to as warping) between the image and the corrected image which can be represented by:

$$H=(KR_2)(R_1^{-1}K^{-1})$$

wherein:

R1 is the rotation matrix of the (first or second) received image and R2 is the rotation matrix of the (first or second) corrected image oriented according to the reference orientation and can be determined using the rotational changes provided by the positional attitude sensor of the system, and K can be determined by calibration of the imaging unit.

$$K = \begin{bmatrix} f_c & s & c_0 \\ 0 & f_r & r_0 \\ 0 & 0 & 1 \end{bmatrix}$$

Wherein:

$f_c$ is a focal of the camera along the column axis;

$f_r$ is a focal of the camera along the row axis;

s is a skewness of the camera;

$c_0$ is a column coordinate of the focal center in the image reference frame;

$r_0$ is row coordinate of the focal center in the image reference frame.

In step S130, distinctive keypoints within a fronto-parallel strip may be detected. It is noted that keypoints located out of the fronto-parallel strip may be discarded from further processing. Keypoints detection may be performed globally on the first corrected image and selection of the keypoints located within the fronto-parallel strip may be then performed. Keypoint detection may be performed using the Shi-Tomasi technique or the like. As explained above, the fronto-parallel strip may be a centro-perpendicular band of the corrected image or a strip including information in closest proximity thereto. The fronto-parallel strip may reflect the portion of the first image which would have appeared in the central perpendicular strip of the first image if the camera was held according to the reference orientation. A direction of the fronto-parallel strip in the corrected image (horizontal or vertical) may depend on a scanning direction. It is noted that the scanning direction may be preliminarily provided to the system, for example by user input, or may alternatively be detected by image processing. Further, a width of the fronto-parallel strip is variable and is set so as to include a sufficient amount of keypoints for enabling estimating the geometric transformation. In step S140, keypoints corresponding to the detected keypoints may be searched in the second corrected image. After detecting the features (keypoints) in step S130, the detected keypoints may be matched in the second corrected image by determining which keypoints are derived from corresponding locations in the first and second images. In some embodiments, searching keypoints corresponding to the detected keypoints may comprise, for each detected keypoint, defining a search area in the second corrected image based on a keypoint position in the first corrected image and on a rotational change between the first and second corrected images and searching only in the defined search area. The rotational change between the first and second corrected images may be derived from the rotational changes of the first and second images with respect to the reference orientation. In some embodiments, the search area may be searched with an incremental registration algorithm. In some embodiments, defining the search area may comprise estimating and correcting a translation of the imaging unit between a first acquisition position of the first image and a second acquisition position of the second image. In a step S150, a geometric transformation may be estimated between the first and second images based on matching of the keypoints in the first and the second corrected images. The estimation of the geometric transformation may be performed using a transformation model involving, exclusively, translation and scale. Step S150 may be referred to as motion parameters estimation or image registration estimation. This model assumption may enable avoidance of a cumulative effect that would deform the further panoramic image. Further, the estimation of the geometric transformation may be performed using a random sample consensus (RANSAC) algorithm. This may enable reduction of parallax issues since RANSAC chooses the most populated point clusters and the most populated point clusters may be correlated to products in the foreground.

Figure 5:
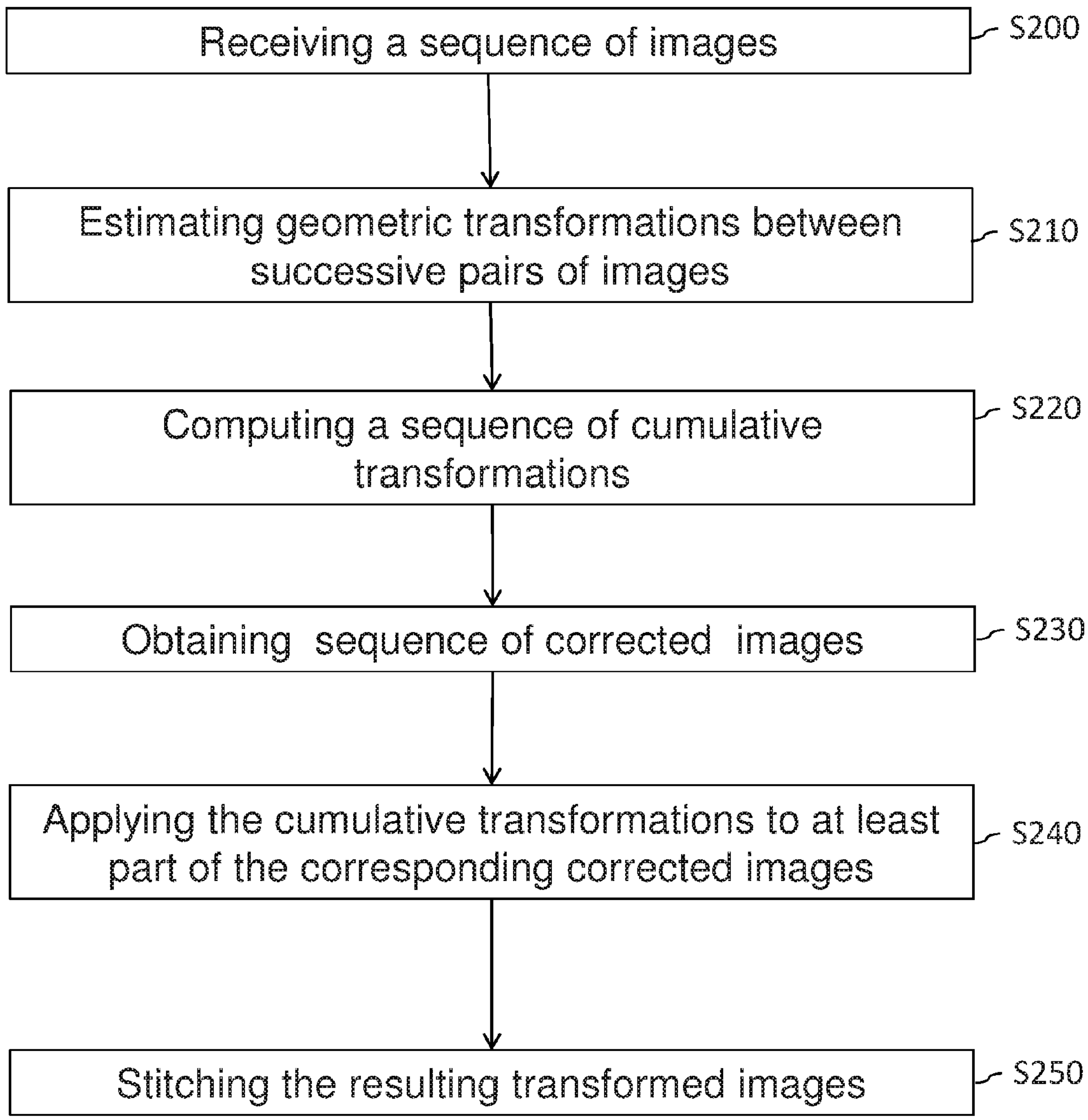
FIG. 5 is a block diagram illustrating steps of a method of creating a panoramic image according to embodiments of the present disclosure.

FIG. 5 illustrates steps of a method of panoramic image creation according to embodiments of the present disclosure. In a step S200, a sequence of images may be received. The sequence of images may result from a rectilinear scanning of the imaging unit previously described. The scanning may be performed in a retail store environment and the scene may therefore be a shelving unit lying along a dominant object plane. The scanning may be horizontal i.e. parallel to shelves of the shelving unit or vertical i.e. perpendicular to the shelves of the shelving unit. An initial image of the sequence (stream) of images may define the reference orientation. It is noted that the sequence of images may be directly received from the imaging unit or may alternatively be preliminarily filtered so as to choose only certain images from the stream of captured images.

Figure 6A:
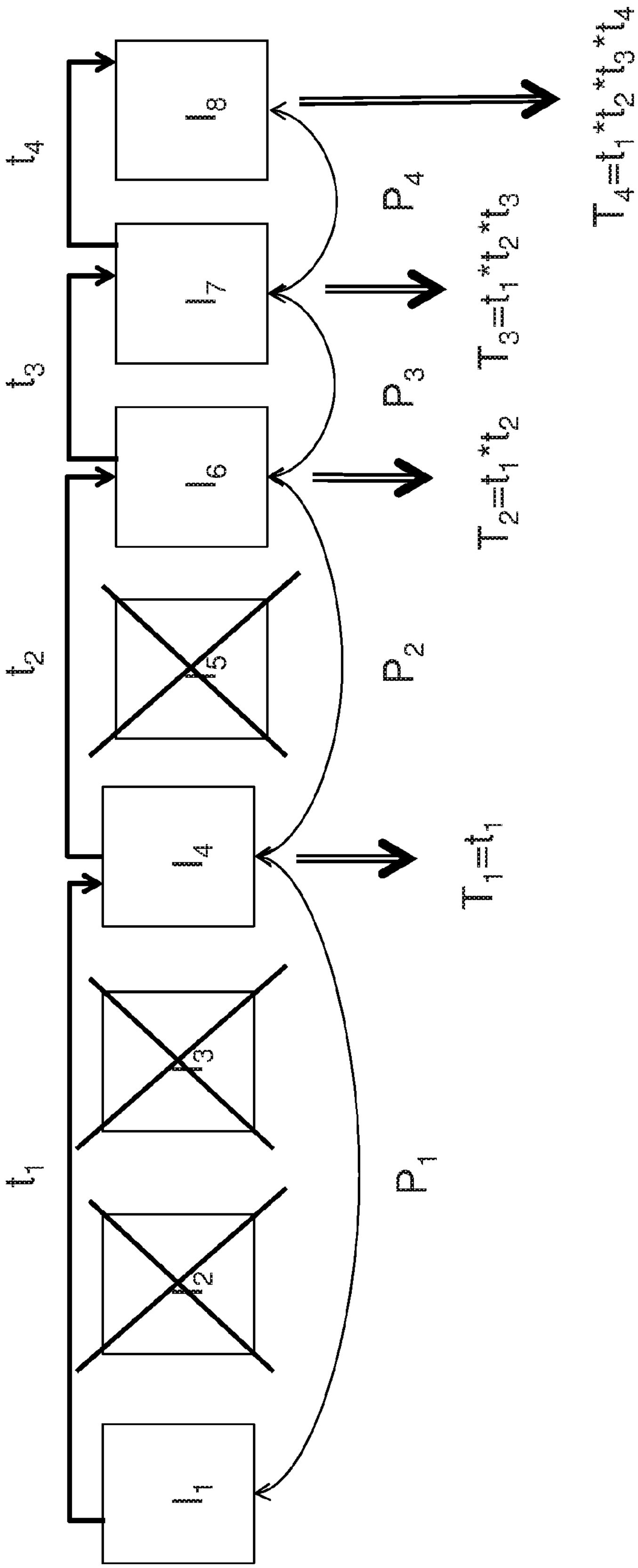
FIGS. 6A-6B illustrate steps related to the computing a cumulative transformation according to embodiments of the present disclosure.

In step S210, geometric transformations may be estimated between a sequence of successive pairs of received images according to the method previously described with reference to FIG. 4. The term successive pairs is understood herein as referring to pairs which include a common image (see FIG. 4). In fact, theoretically, each pair of consecutive images of the sequence may be processed. FIG. 6A illustrates a practical case comprising $I_1$-$I_6$ received images, $P_1$-$P_4$ successive pairs of images, $t_1$-$t_4$ geometric transformations and $T_1$-$T_4$ cumulative transformations. As illustrated on FIG. 6A by crossed images $I_2$, $I_3$, and $I_5$, in practical situations, certain received images may be discarded from the received images for example because a geometric transformation cannot be estimated due to obstruction of a foreign object before the imaging unit. Therefore, successive pairs $P_1$-$P_4$ of images between which the geometric transformation can be estimated may be defined (a priori and/or a posteriori). More particularly, each successive pair of received images may comprise a first image of the pair and a second image of the pair. The first and second image may be downsampled and the rotational change of the first and second images with respect to the reference orientation may be compensated by warping the downsampled first and second images thereby obtaining first and second corrected images. This enables to apprehend an orientation variation between the images and the initial image. Thereafter, a fronto parallel strip of the first corrected image may be determined and keypoints located within the fronto-parallel strip may be detected. Keypoints corresponding to the detected keypoints may be searched in the second corrected image and the geometric transformation between the pair of image may be estimated based on matching the keypoints in the first and second corrected images. This enables to apprehend a translation and scale variation between the pair of images.

Figure 6B:
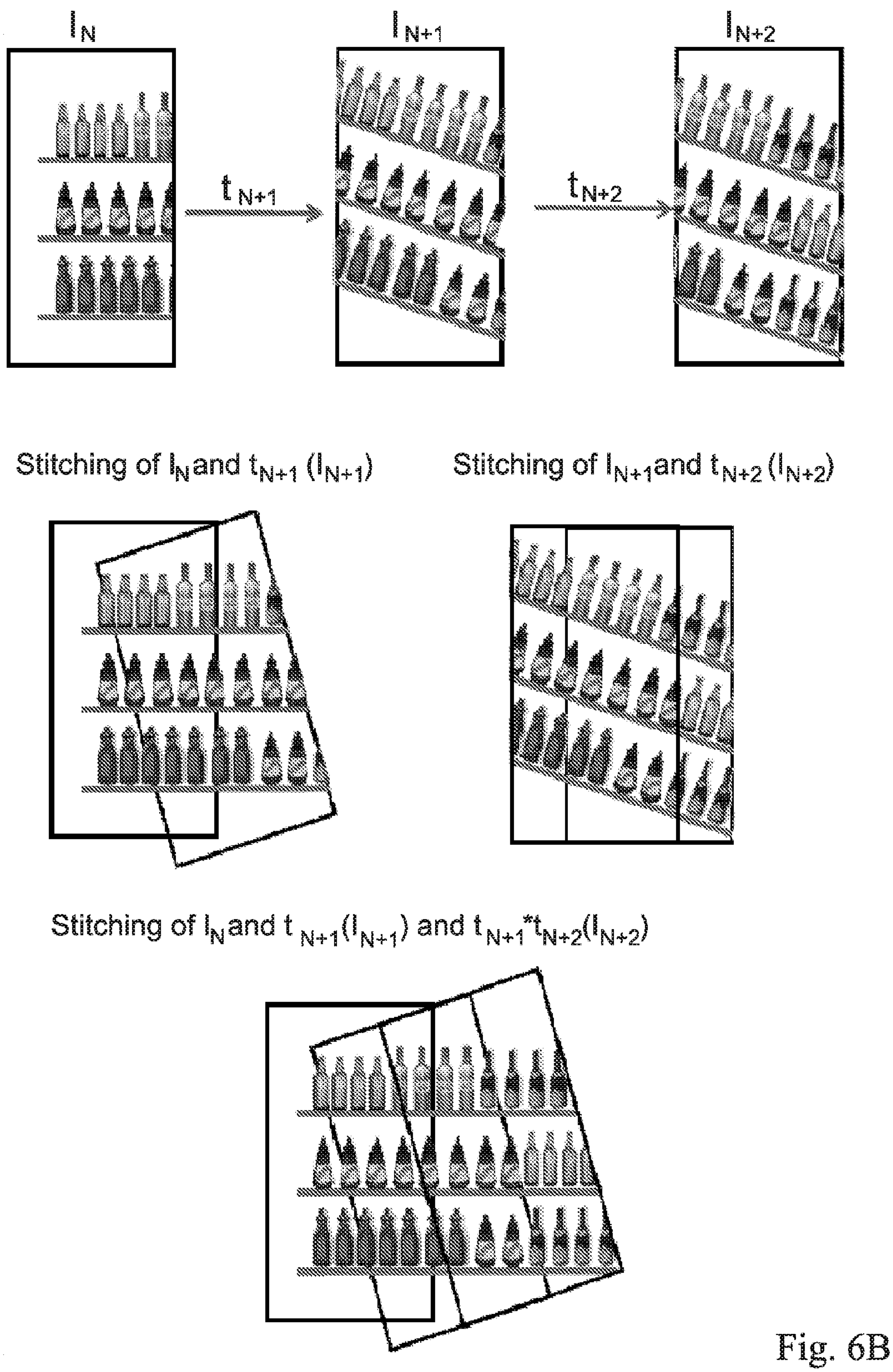

In step S220, a sequence of cumulative transformations linking each image of the sequence of successive pairs to the initial image may be computed. As illustrated in FIG. 6B, for images $I_N$, $I_{N+1}$ and $I_{N+2}$, the previously estimated geometric transformation $T_{N+1}$ and $T_{N+2}$ respectively compensate for the translation and scale variations from $I_N$ to $I_{N+1}$ and from $I_{N+1}$ to $I_{N+2}$. Therefore, in order to obtain a transformation which compensate for the translation and scale variations from $I_{N+2}$ to $I_N$, a combined transformation $T_{N+1}*T_{N+2}$ may be calculated. Therefore, as illustrated on FIGS. 6A-6B, the sequence of cumulative transformations, wherein each cumulative transformation is associated with a received image of the sequence of successive pairs of received images, may be computed by combining, for each image of the sequence of successive pairs of received images after the initial image (first image of said sequence), the geometric transformations estimated for the one or more images preceding said image.

In a step S230, a sequence of (orientation) corrected images corresponding to the received images of the successive pairs may be obtained. The corrected images may be obtained by processing data representative of at least part of said received images. In some embodiments, the processing may be performed on high resolution and/or color versions of at least part of the received images. This may enable obtaining a stitched image of high quality for output to further image recognition processing. In some other embodiments, the processing may be performed on low resolution versions of at least part of the received images. A downsampling factor of such versions may be superior to 0.5. This may enable computing a real time preview of the stitched image.

In a further step S240, a sequence of transformed images may be obtained by applying each computed cumulative transformation to at least part of the corrected image corresponding to the received image associated with said cumulative transformation. In some embodiments, the cumulative transformations may be applied to the whole corrected images. In some embodiments, the cumulative transformations may be applied only to the fronto parallel strips of the corrected images until the penultimate corrected image. The cumulative transformation associated to the ultimate image of the sequence may be applied to the fronto-parallel portion and to an additional portion of the ultimate image. The latter alternative enables to improve calculation time.

In a further step S250, the sequence of transformed images may be stitched, thereby leading to a stitched image. The stitching may include using a seam algorithm, in particular when the stitched image is obtained from high resolution versions of the received images (for output purposes). The stitching may also include simple blending, in particular when the stitched image is obtained from low resolution versions of the received images (for preview purposes). The stitching of the sequence of transformed images may be performed iteratively by computing, for each transformed image, an associated floating stitched image using said transformed image and a floating stitched image associated with a previous transformed image in the sequence of transformed images. Further, the computing may comprise appending an inner slice of the transformed image at an edge of the floating stitched image associated with the prior (directly) transformed image in the sequence of transformed images. Alternatively, the computing may comprise superimposing an outer slice of the transformed image at an inner stitching portion of the floating stitched image associated with the prior transformed image in the sequence of transformed images.

Furthermore, in some embodiments, the method may also comprise a step of displaying in real time a panoramic image preview on the display unit of the system while scanning the scene. The panoramic image preview may be computed upon receiving the sequence of images. The sequence of cumulative transformation may be computed progressively and may be applied to downsampled versions of the corrected images to obtain the panoramic image preview.

Figure 7:
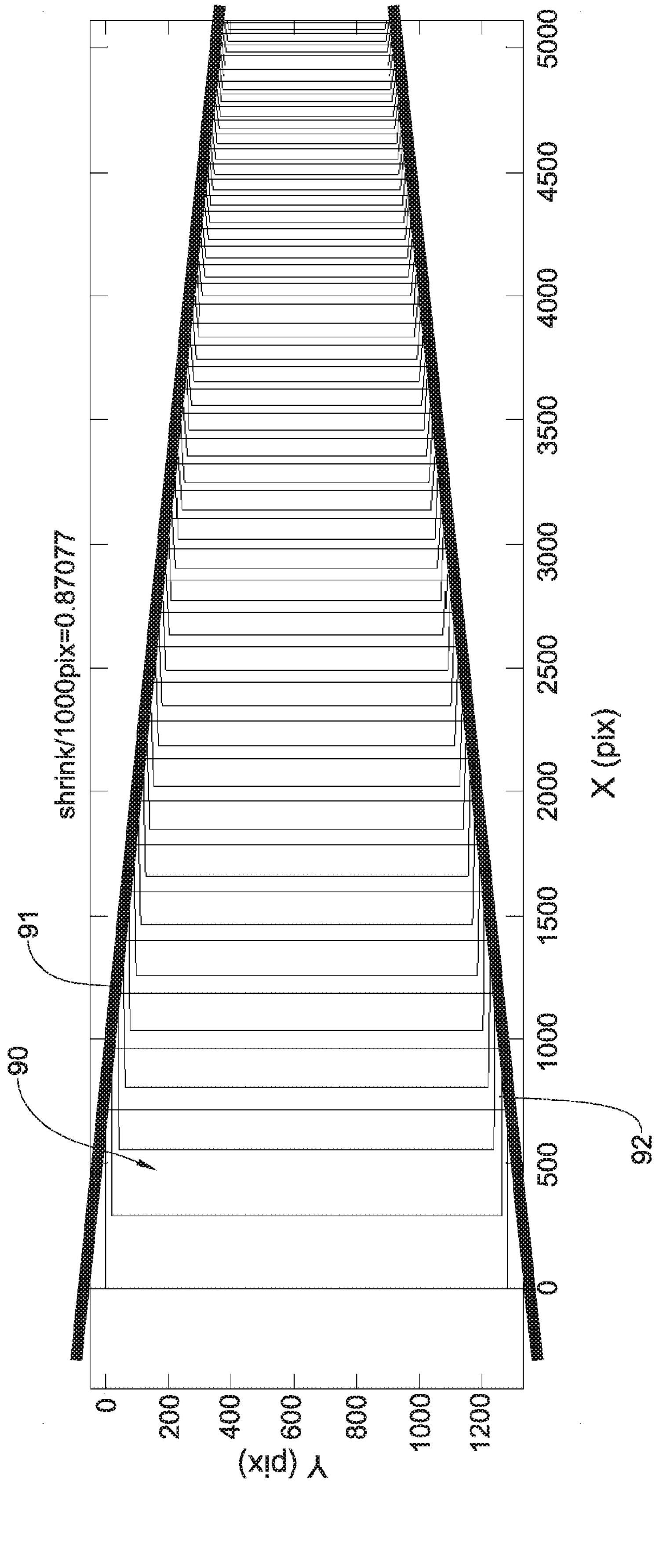
FIG. 7 illustrates a step of monitoring of an aperture level of the stitched image according to embodiments of the present disclosure.

FIG. 7 illustrates a further step of monitoring an aperture level of the stitched image. As illustrated, a (floating) stitched image 90 may be bounded by an upper line 91 joining upper edges of stitched portions of the (floating) stitched image 90 and a lower line 92 joining lower edges of the stitched portions of the (floating) stitched image 90. The aperture level of the stitched image may be characterized by an angle between the upper line 91 and the lower line 92. In fact, in ideal conditions, when imaging a shelving unit, the aperture level may stay approximately equal to zero. However, notably because the reference orientation of the initial image may not be exactly perpendicular to the dominant object plane of the scene imaged, the aperture level may vary considerably. Therefore, the present disclosure provides a step of monitoring the aperture level of the stitched image and the possibility of modifying the reference orientation taken into consideration in the processing, when the aperture level exceeds a predefined threshold. In fact, detecting the above described imperfection on the stitched image may be easier than extracting the same information between two consecutive images. Another way to detect the aperture level in a retail store environment (when imaging a shelving unit) may be by detecting the shelves. In some embodiments, the method may comprise detecting shelves on the image and deriving an orientation of the imaging unit based on an inclination level of the detected shelves. Further, this may be used to correct the orientation during scanning and/or while capturing the initial image.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A non-transitory computer readable medium including instructions that when executed by a processor cause the processor to perform a method for stitching a sequence of images captured by a handheld device, the method comprising:

receiving a sequence of images of a shelving unit acquired using an imaging unit along a scanning direction in a retail store environment, wherein a plurality of images in the sequence are rotated relative to a reference orientation;

determining a first orientation of the imaging unit relative to the reference orientation while a first image is acquired based on an inclination level of shelves of the shelving unit detected in the first image;

determining a fronto-parallel strip for the first image based on the first orientation, wherein the fronto-parallel strip is substantially perpendicular to the scanning direction and positioned substantially in a center of the first image;

detecting distinctive features within the fronto-parallel strip of the first image;

matching the distinctive features detected in the fronto-parallel strip with distinctive features found in a second image associated with a second orientation of the imaging unit relative to the reference orientation; and based on the matching, estimating a geometric transformation to enable stitching of the first image with the second image.

2. The non-transitory computer readable medium of claim 1, wherein a width of the fronto-parallel strip is variable and includes a sufficient amount of distinctive features for enabling estimation of the geometric transformation.

3. The non-transitory computer readable medium of claim 2, wherein the width of the fronto-parallel strip is in a range between of 1% and 10% of a field of view of an imaging sensor of the handheld device.

4. The non-transitory computer readable medium of claim 1, wherein additional distinctive features located in the first image and outside of the fronto-parallel strip are discarded from further processing.

5. The non-transitory computer readable medium of claim 1, wherein the reference orientation is an orientation of an initial image that differs from the first image.

6. The non-transitory computer readable medium of claim 1, wherein determining the fronto-parallel strip of the first image includes determining an orientation of the first image relative to the reference orientation using measurements obtained from a positional sensor within the handheld device.

7. The non-transitory computer readable medium of claim 6, wherein determining the fronto-parallel strip of the first image includes correcting the orientation of the first image with respect to the reference orientation based on a rotational change of first image.

8. The non-transitory computer readable medium of claim 7, wherein the fronto-parallel strip is determined to be in a center of the corrected first image.

9. The non-transitory computer readable medium of claim 1, wherein determining the fronto-parallel strip of the first image includes determining a theoretical central strip and a rotational threshold, and when the rotational change of the first image relative to the reference orientation is higher than the threshold rotational, the fronto-parallel strip is determined as the band in closest proximity to the theoretical central strip that contains distinctive features.

10. The non-transitory computer readable medium of claim 9, wherein the rotational threshold is determined based on parameters associated with an imaging sensor within the handheld device.

11. The non-transitory computer readable medium of claim 1, wherein the fronto-parallel strip is a vertical strip when the sequence of images results from a horizontal scanning.

12. The non-transitory computer readable medium of claim 1, wherein the fronto-parallel strip is a horizontal strip when the sequence of images results from a vertical scanning.

13. The non-transitory computer readable medium of claim 1, wherein matching the detected distinctive features includes:

defining a search area in the second image based on a position of a detected feature in the first image and on a rotational change of the first and second images; and searching for the detected feature in the defined search area.

14. The non-transitory computer readable medium of claim 1, wherein the geometric transformation includes a scale deformation based on distinctive features found in the fronto-parallel strip.

15. The non-transitory computer readable medium of claim 1, further comprising:

estimating multiple geometric transformations between a plurality of successive pairs of images in the sequence of images to enable stitching a plurality of the images in the sequence of images.

16. The non-transitory computer readable medium of claim 1, wherein the sequence of images is acquired during a rectilinear movement.

17. A handheld device, comprising:

memory;

an imaging unit including at least one imaging sensor configured to capture a sequence of images of a shelving unit acquired along a scanning direction in a retail store environment, wherein a plurality of images in the sequence are rotated relative to a reference orientation;

a processor configured to:

determine a first orientation of the imaging unit relative to the reference orientation while a first image is acquired based on an inclination level of shelves of the shelving unit detected in the first image;

determine a fronto-parallel strip for the first image based on an amount orientation, wherein the fronto-parallel strip is substantially perpendicular to the scanning direction and positioned substantially in a center of the first image;

detect distinctive features within the fronto-parallel strip of the first image;

match the distinctive features detected in the fronto-parallel strip with distinctive features found in a second image associated with a second orientation of the imaging unit relative to the reference orientation; and based on the match, estimate a geometric transformation to enable stitching of the first image with the second image.

18. The handheld device of claim 17, wherein the width of the fronto-parallel strip is in a range between of 1% and 5% of a field of view of the imaging sensor.

19. The handheld device of claim 17, further comprising a positional sensor, and the processor is further configured to determine the fronto-parallel strip of the first image using measurements obtained from the positional sensor.

* * * * *